(12) United States Patent
Lee et al.

(10) Patent No.: US 10,689,499 B2
(45) Date of Patent: Jun. 23, 2020

(54) SOLVENT SEPARATION APPARATUS AND WASTE HEAT UTILIZATION METHOD

(71) Applicant: LG Chem, Ltd., Seoul (KR)

(72) Inventors: Sung Kyu Lee, Daejeon (KR); Ha Na Lee, Daejeon (KR); Joon Ho Shin, Daejeon (KR)

(73) Assignee: LG Chem, Ltd. (KR)

( * ) Notice: Subject to any disclaimer, the term of this patent is extended or adjusted under 35 U.S.C. 154(b) by 188 days.

(21) Appl. No.: 15/766,435

(22) PCT Filed: Jun. 12, 2017

(86) PCT No.: PCT/KR2017/006057
§ 371 (c)(1),
(2) Date: Apr. 6, 2018

(87) PCT Pub. No.: WO2017/217709
PCT Pub. Date: Dec. 21, 2017

(65) Prior Publication Data
US 2018/0319948 A1   Nov. 8, 2018

(30) Foreign Application Priority Data
Jun. 16, 2016 (KR) .......... 10-2016-0074840

(51) Int. Cl.
*C08J 11/02* (2006.01)
*C08F 6/12* (2006.01)
(Continued)

(52) U.S. Cl.
CPC .............. *C08J 11/02* (2013.01); *B01D 3/007* (2013.01); *B01D 3/14* (2013.01); *B01D 3/38* (2013.01); *B01D 5/006* (2013.01); *C08F 6/001* (2013.01); *C08F 6/10* (2013.01); *C08F 6/12* (2013.01); *C08F 236/06* (2013.01); *F28D 7/00* (2013.01)

(58) Field of Classification Search
USPC .......................... 528/500; 203/96; 159/24.2
See application file for complete search history.

(56) References Cited

U.S. PATENT DOCUMENTS

| 4,406,750 A | 9/1983 | Irvin |
| 4,504,692 A | 3/1985 | Arakawa et al. |

(Continued)

FOREIGN PATENT DOCUMENTS

| CN | 101259336 A | 9/2008 |
| CN | 105492842 A | 4/2016 |

(Continued)

OTHER PUBLICATIONS

Search report from International Application No. PCT/KR2017/006057, dated Sep. 11, 2017.

(Continued)

*Primary Examiner* — Fred M Teskin
(74) *Attorney, Agent, or Firm* — Lerner, David, Littenberg, Krumholz & Mentlik, LLP

(57) ABSTRACT

The present invention relates to a solvent separation apparatus and a waste heat utilization method, and the solvent separation apparatus and the waste heat utilization method according to the present application can reduce the used amount of cooling water and the used amount of steam, in a process of separating a polymer and a solvent.

11 Claims, 1 Drawing Sheet

(51) Int. Cl.
*B01D 3/38* (2006.01)
*B01D 5/00* (2006.01)
*C08F 6/10* (2006.01)
*F28D 7/00* (2006.01)
*B01D 3/00* (2006.01)
*B01D 3/14* (2006.01)
*C08F 236/06* (2006.01)
*C08F 6/00* (2006.01)

(56) References Cited

U.S. PATENT DOCUMENTS

| | | | |
|---|---|---|---|
| 4,783,242 A * | 11/1988 | Robbins | B01D 1/2856 |
| | | | 159/24.3 |
| 2004/0024146 A1 | 2/2004 | Friedersdorf | |
| 2016/0187036 A1 | 6/2016 | Lee et al. | |
| 2019/0308115 A1* | 10/2019 | Lee | B01D 5/006 |

FOREIGN PATENT DOCUMENTS

| | | |
|---|---|---|
| EP | 0360890 A1 | 4/1990 |
| JP | S63027506 A | 2/1988 |
| KR | 20040042561 A | 5/2004 |
| KR | 100769774 B1 | 10/2007 |
| KR | 20150000422 A | 1/2015 |
| WO | 2014074261 A1 | 5/2014 |

OTHER PUBLICATIONS

Chinese Search Report for Application No. CN201780003879.7 dated Nov. 4, 2019.

* cited by examiner

US 10,689,499 B2

SOLVENT SEPARATION APPARATUS AND WASTE HEAT UTILIZATION METHOD

CROSS-REFERENCE TO RELATED APPLICATIONS

This application is a national phase entry under 35 U.S.C. § 371 of International Application No. PCT/KR2017/006057, filed Jun. 12, 2017, which claims priority to Korean Patent Application No. 10-2016-0074840 filed Jun. 16, 2016, the disclosures of which are incorporated herein by reference.

TECHNICAL FIELD

The present application relates to a solvent separation apparatus for separating a mixture of a polymer and a solvent and a waste heat utilization method.

BACKGROUND ART

In many processes of producing polymers or petrochemicals, a stripping process has been operated as a process following polymerization. The stripping process uses a method such as steam stripping and distillation in order to recover unreacted monomers and solvents after reaction and reuse them. A description of the steam stripping for recovering solvents in this method is well described in Korean Laid-Open Patent Publication No. 2004-0042561. In a general steam stripping method, the polymer solution is introduced into a high-temperature water and the solvent is volatilized and removed together with water vapor using steam to recover the polymer.

The stripping unit used for stripping is for evaporating and separating mixed materials of two or more components present in a feedstock by the boiling point difference. At the upper part of a distillation system, a low-boiling material (high volatile component) is evaporated and separated in a form of the upper vapor and at the lower part of the distillation system, a high-boiling material (low volatile component) is separated in a form of condensate. The low-boiling material and the high-boiling material may also be each a single component or a mixture of two or more components.

As a representative process for separating a mixture of a polymer and a solvent, and the like using such a stripping unit, there is a synthetic rubber production process. The synthetic rubber refers to a polymer material having the same or similar physical properties as natural rubber, and includes butadiene rubber, acrylonitrile butadiene rubber, styrene butadiene rubber, solution styrene butadiene rubber or ultra high-cis polybutadiene rubber, and the like. The solvent may include (normal)hexane.

The attached FIG. 1 is a schematic diagram illustrating a solvent separation apparatus used in a general stripping process. As shown in FIG. 1, typically, in the conventional stripping process, water supplied from the water tank (10) and steam are mixed with a mixture of polymerized polymer and a solvent and supplied to the stripping unit (20). The top stream (201) discharged from the top region of the stripping unit (20) is condensed in the condenser (30) and then introduced into an oily water separator (50) through a cooler (40). The solvent separation apparatus uses a middle pressure steam (MP) as a heat source, and in this process, a large amount of energy is consumed.

Therefore, in order to reduce the energy consumed in the solvent separation process, there is a need for a method capable of recovering and using the discarded waste heat.

DISCLOSURE

Technical Problem

The present invention is intended to provide a solvent separation apparatus and a waste heat utilization method using the solvent separation apparatus.

Technical Solution

The present application relates to a solvent separation apparatus and a waste heat utilization method. According to an exemplary solvent separation apparatus of the present application and the waste heat utilization method using the solvent separation apparatus, the waste heat of oil mist discharged from the top region of the stripping apparatus for separating the product after reaction into the polymer and the solvent in the polymer production process is recovered, and used in the process of transferring the product to the stripping unit after the synthetic rubber production reaction, whereby the energy can be reduced by recovering the discarded waste heat.

In this specification, the term 'and/or' is used as a meaning to include at least one or more of components listed before and after.

In this specification, the term "piping system" may mean a structure that includes pipes or lines connecting devices, where "lines" may be substantially the same sense as pipes, the "stream" may mean movement of a fluid through a line or a pipe, and the line, pipe, and stream herein may share the same reference numeral.

The terms, such as "first," "second," "third," "one side," and "other side," herein are used to distinguish one component from other components, where each component is not limited by the terms. Hereinafter, in explaining the present application, detailed descriptions of known general functions or configurations related thereto are omitted.

Hereinafter, the solvent separation apparatus and the waste heat utilization method of the present application will be described in detail.

The solvent separation apparatus and the waste heat utilization method of the present application can heat water used for transferring the synthetic rubber product to the stripping unit by heat exchange with the top stream discharged from the top region of the stripping unit for separating the product into the polymer and the solvent after the reaction in the synthetic rubber production process, and supply the water into the stripping unit. In this specification, "stripping" means separation and removal of gas dissolved in liquid, which may be performed by, for example, direct contact with steam, inert gas or air, and the like, and a method such as heating and pressing, and the stripping herein can be used as the same sense as stripping, dissipating or separating.

The synthetic rubber production process of the present application comprises a process of producing butadiene rubber (BR), acrylonitrile-butadiene rubber (NBR), styrene-butadiene rubber (SBR), solution styrene-butadiene rubber (SSBR), ultra high-cis polybutadiene rubber, and the like. The butadiene rubber (BR), acrylonitrile-butadiene rubber (NBR), styrene-butadiene rubber (SBR), solution styrene-butadiene rubber (SSBR), ultra high-cis polybutadiene rubber, and the like can be produced by continuous polymerization with a method of solution polymerization or emulsion polymerization.

When the synthetic rubber is produced using the solution polymerization, a viscous material solution, which is a mixture of the polymer and the solvent after the polymerization reaction, is separated to the solvent and the polymer by stripping with steam. Also, when the synthetic rubber is produced using emulsion polymerization, the polymer produced after the polymerization reaction and the unreacted monomer and the solvent are separated by stripping after degassing, respectively.

As such, water is heated by heat exchange with oil mist discharged from the top region of the stripping unit used in the process of producing butadiene rubber (BR), acrylonitrile-butadiene rubber (NBR), styrene-butadiene rubber (SBR), solution styrene-butadiene rubber (SSBR), ultra high-cis polybutadiene rubber, and the like by a method of solution polymerization or emulsion polymerization, and supplied to a process for transferring the mixture of the polymer and the solvent, which is a product of production reaction, to the stripping unit, whereby the used amount of cooling water can be reduced and the energy used for heating water can be reduced.

Hereinafter, the present application will be described in detail with reference to the accompanying drawings.

The accompanying drawings illustrate exemplary embodiments of the present application, which are only provided to assist in understanding the present application, whereby the technical scope of the present application is not limited.

FIG. 2 is a diagram schematically showing a solvent separation apparatus according to an exemplary embodiment of the present application. Referring to FIG. 2, the solvent separation apparatus according to the present application comprises a stripping unit, a water tank and a piping system.

For example, the solvent separation apparatus may comprise a water tank (10), a stripping unit (20), a cooling unit (40) and a piping system.

The water tank (10) is a device capable of supplying water, and its shape and structure are not particularly limited.

The "stripping unit" is a device capable of separating multi-component materials contained in raw materials by each boiling point difference, or a stripping unit for separating gas in the raw material and materials to be separated from raw materials. As the stripping unit (20), a stripping unit having various forms can be used in the present application in consideration of boiling points or the like of components of a raw material to be introduced or components to be separated, and the like.

The stripping unit of the present application can remove the solvent by introducing a polymer solution into hot water and volatilizing the solvent together with water vapor using steam. The stripping unit may be configured such that the polymer solution containing the solvent to be recovered and the stream of the steam providing heat required upon recovering flow in opposite directions (counter current) to each other. In the process of recovering the polymer by stripping, the stripping unit can be filled therein with water in order to maintain a constant S/C (slurry content, mass of the rubber-like polymer in the stripping unit/total mass of the contents excluding the solvent in the stripping unit).

In one example, as the stripping unit (20) or a stripping unit that can be used as a stripper, for example, a distillation column or device having general structure can be used, and preferably, a stripping unit in a form that two stripping units are connected to each other can be used.

In one example, the stripping unit (20) may comprise a feedstock supply part to which a raw material is supplied, a first outflow part for discharging a lower product of the stripping unit (20), and a second outflow part for discharging an upper product of the stripping unit (20).

The first outflow part may be located at the lower part of the stripping unit (20) and/or the bottom of the stripping unit, and the second outflow part may be located at the upper part of the stripping unit (20) and/or the top of the stripping unit. In this specification, the "upper part" may mean a relatively upper portion within the stripping unit, and more specifically, when the stripping unit is vertically bisected in a longitudinal direction, for example, in a length or height direction of the stripping unit, it may mean the upper part of two divided regions. Here, the "lower part" may also mean a relatively lower portion within the stripping unit, and more specifically, when the stripping unit is vertically bisected in a longitudinal direction, for example, in a length or height direction of the stripping unit, it may mean the lower part of two divided regions. In addition, the "top" of the stripping unit may mean the topmost portion of the stripping unit and may be located at the above-described upper part of the stripping unit, and the "bottom" of the stripping unit may mean the bottommost portion of the stripping unit and may be located at the above-described lower part of the stripping unit. In one example, there may be the middle part region between the upper part and the lower part of the stripping unit, and the upper part, middle part and lower part regions of the stripping unit may be used herein as relative concepts to each other. For example, when the stripping unit is bisected in the longitudinal direction, the stripping unit can be divided into upper part and lower part regions, and in this case, the stripping can occur in the upper part region and the lower part region. In addition, when the stripping unit is trisected in the longitudinal direction, the stripping unit can be divided into the upper part, the middle part and the lower part, and in this case, the stripping can occur in all the upper part, middle part and lower part regions or may also occur only in the middle part region.

The "cooling unit" and the "condenser" are a device installed separately from the stripping column, which may mean a device for cooling a material discharged from the stripping column by a method such as contacting it with the cooling water introduced from the outside. For example, the cooling unit (40) and the condenser (30) may be a device for cooling the top stream (201) discharged from the top region of the stripping unit (20).

The piping system may comprise a first pipe line formed so that the mixture comprising the polymer and the solvent and water from the water tank can be mixed and then introduced into the stripping unit, and a second pipe line formed so that the mixed liquid of water and the solvent discharged from the stripping unit can be transferred to the cooling unit, and the piping system may further comprise a heat exchange part formed so that before the water discharged from the water tank is mixed with the mixture, it can be heat-exchanged with the mixed liquid before being introduced into the cooling unit.

The first pipe line may comprise a water supply stream (101), a steam supply stream (111) and a polymer influent stream (121). For example, the water supply stream (101) supplied from the water tank (10), the steam supply stream (111), the polymer influent stream (121) and the stripping unit (20) may be connected to one other through pipes. Preferably, they may be fluidically connected so that the water supplied from the water tank (10) and the steam supply stream (111) can be mixed in the steam mixer (70), mixed with the mixture of the polymer and the solvent, and then introduced into the stripping unit (20) through the polymer influent stream (121).

The second pipe line may comprise a top line (201) and a cooling unit (40) discharged from the stripping unit (20). The mixed liquid of water and the solvent discharged from the stripping unit (20) can be introduced into the cooling unit (40) through the top line (201).

The heat exchange part may comprise a heat exchanger (60) in which before the water discharged from the water tank (10) is mixed with the mixture comprising the polymer and the solvent, it can be heat-exchanged with the mixed liquid before being introduced into the cooling unit.

The "heat exchanger" is a device which is installed separately outside the stripping column and performs heat exchange such that heat transfer between two fluid streams having different temperatures from each other occurs smoothly, and for example, the heat exchanger (60) may be a device for heat-exchanging the top stream (201) discharged from the top region of the stripping column (20) and the water influent stream (61). In the solvent separation apparatus of the present application, the top stream (201) discharged from the top region of the stripping column (20) and the water influent stream (61) are heat-exchanged in the heat exchanger (60) to each other and supplied into the water supply stream (101) through the water influent stream (62), whereby the energy required to transfer the mixture of the polymer and the solvent can be reduced.

In one example, the solvent separation apparatus of the present application may satisfy Equation 1 below.

$$|Tc-Te| \leq 40° C. \qquad \text{[Equation 1]}$$

In Equation 1 above, Tc represents a temperature of the fluid discharged from the condenser, and Te represents a temperature of the stream discharged from the heat exchanger.

In the solvent separation apparatus, by controlling a difference between the temperature of the condenser influent stream (301) of the condenser (30) and the temperature of the water effluent stream (62) discharged from the heat exchanger (60) in the range of Equation 1 above, the used amount of steam for transferring the mixture of the polymer and the solvent, and the like, which is a product after the reaction for producing synthetic rubber, to the stripping column (20) can be reduced. In one example, the difference between the temperature of the condenser effluent stream (301) of the condenser (30) and the temperature of the water effluent stream (62) discharged from the heat exchanger (60) is not particularly limited as long as it is within the above-described range, and for example, may be 40° C. or lower, 30° C. or lower, 20° C. or lower, or 10° C. or lower, and the lower limit is not particularly limited. The temperature of the condenser effluent stream (301) of the condenser (30) is not particularly limited as long as it satisfies Equation 1 above, but it may be 70 to 100° C., for example, 80 to 100° C., 90 to 100° C., 70 to 90° C. or 80 to 90° C. In addition, the temperature of the water effluent stream (62) discharged from the heat exchanger (60) is not particularly limited as long as it satisfies Equation 1 above, but it may be 50 to 80° C., for example, 60 to 80° C., 70 to 80° C., 50 to 70° C., or 60 to 70° C.

The present application also relates to a waste heat utilization method. The waste heat utilization method can be performed by the above-described solvent separation apparatus. An exemplary method may comprise steps of mixing a mixture comprising a polymer and a solvent with water discharged from a water tank and introducing the mixture into a stripping unit; and introducing the mixture of the water and the solvent discharged from the stripping unit into a cooling unit, and may further comprise a step in which before the water discharged from the water tank is mixed with the mixture, it is heat-exchanged with a mixed liquid before being introduced into the cooling unit in a heat exchanger.

The waste heat utilization method according to one embodiment of the present application may comprise steps of introducing a water supply stream (101) and a steam supply stream (111) into a steam mixer (70) and mixing them, supplying the steam discharged from the steam mixer (70) to a polymer influent stream (121) and introducing it into a stripping unit (20), condensing a top stream (201) discharged from the top region of the stripping unit (20) in a condenser (30) and introducing it into a heat exchanger (60) through a condenser effluent stream (301), and heat-exchanging the condenser effluent stream (301) with the water influent stream (61) introduced from the water supply stream (101).

In one example, the temperature (Tc) of the condenser effluent stream (301) discharged from the condenser (30) and the temperature (Te) of the water effluent stream (62) heat-exchanged in and discharged from the heat exchanger (60) can be controlled to satisfy Equation 1 below.

$$|Tc-Te| \leq 40° C. \qquad \text{[Equation 1]}$$

In Equation 1 above, Tc represents a temperature of the fluid discharged from the condenser, and Te represents a temperature of the stream discharged from the heat exchanger.

In the waste heat utilization method, by controlling the temperature (Tc) of the condenser effluent stream (301) discharged from the condenser (30) and the temperature (Te) of the water effluent stream (62) heat-exchanged in and discharged from the heat exchanger (60) so as to satisfy Equation 1 below, the used amount of steam for transferring the mixture of the polymer and the solvent, which is a product after the synthetic rubber production reaction, to the stripping column (20) can be reduced. In one example, the difference between the temperature (Tc) of the condenser effluent stream (301) discharged from the condenser (30) and the temperature (Te) of the water effluent stream (62) heat-exchanged in and discharged from the heat exchanger (60) is not particularly limited as long as it is within the above-described range, but it may be 70° C. to 100° C., for example, 80° C. to 100° C., 90° C. to 100° C., 70° C. to 90° C., or 80 to 90° C. In addition, the temperature of the water effluent stream (62) discharged from the heat exchanger (60) is not particularly limited as long as it satisfies Equation 1 above, but it may be 50° C. to 80° C., for example. 60° C. to 80° C., 70° C. to 80° C., 50° C. to 70° C., or 60° C. to 70° C.

Advantageous Effects

According to the present application, the waste heat from the stripping unit condenser is recovered and supplied to transfer the mixture of the polymer and the solvent, which is a product of the polymerization reaction, whereby the energy can be significantly reduced as compared to the conventional stripping process.

BEST MODE

Hereinafter, the present application will be described in more detail by way of examples according to the present application and comparative examples that do not comply with the present application, but the scope of the present application is not limited by the following examples.

Example

Figure 2:
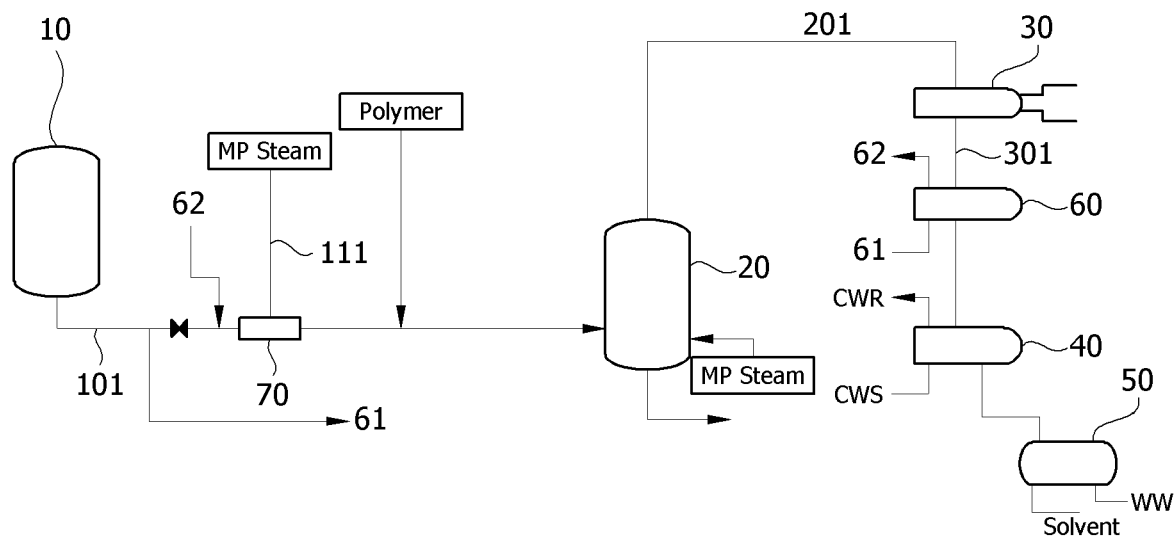
FIG. 2 is a configuration diagram of a solvent separation apparatus according to an embodiment of the present application.

As illustrated in FIG. 2, the water influent stream (61) introduced from the water supply stream (101) was heat-exchanged by introducing the top stream (201), which is discharged from the top region of the stripping column (20) and passes through the condenser (30), to the heat exchanger (60) and then supplied to the water supply stream (101) through the water effluent stream (62). The temperature of the condenser effluent stream (301) discharged from the condenser (30) was 90° C. and the temperature of the water effluent stream (62) heat-exchanged in and discharged from the heat exchanger (60) was subjected to be 70° C.

Comparative Example

Figure 1:
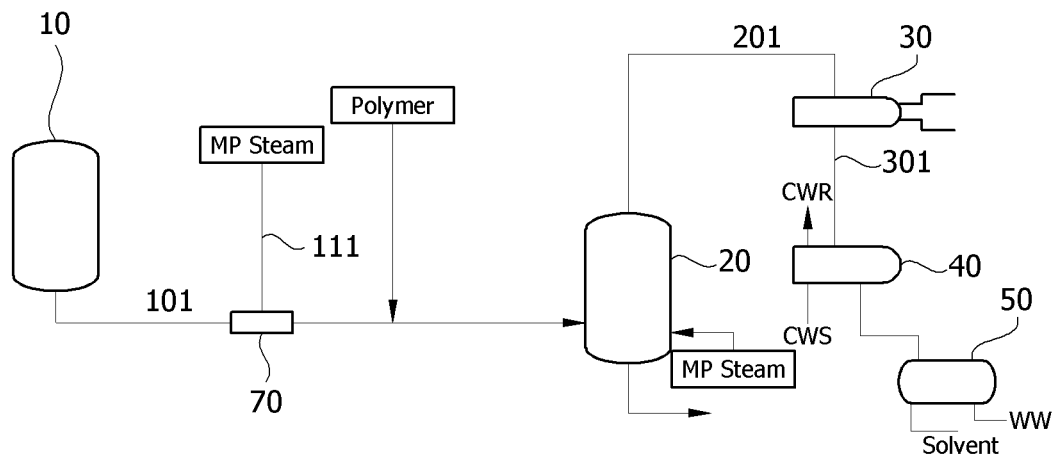
FIG. 1 is a configuration diagram for explaining a solvent separation process of a conventional stripping unit for separating a polymer and a solvent.

As illustrated in FIG. 1, the top stream (201) discharged from the top region of the stripping column (20) was condensed through the condenser (30), then cooled through the cooler (40) and introduced into the oily water separator (50), and the waste heat from the cooling water supplied to the condenser (30) was discarded.

TABLE 1

|  | Cooling Water Supply (ton/hour) | Used Amount of Steam (ton/hour) |
|---|---|---|
| Example | 270 | 1.5 |
| Comparative Example | 510 | 6.0 |

As shown in Table 1, when the polymer and the solvent are separated using the solvent separation apparatus and the waste heat utilization method of the present application, it can be confirmed that the used amount of cooling water of at most 47% can be reduced and the used amount of steam of at most 75% can be reduced.

The invention claimed is:

1. A solvent separation apparatus comprising a stripping unit for separating a polymer from a mixture comprising a polymer and a solvent; a water tank; a cooling unit, a condenser and a piping system, wherein said piping system comprises a first pipe line formed so that said mixture comprising the polymer and the solvent and water from said water tank can be mixed and then introduced into said stripping unit, and a second pipe line formed so that the mixed liquid of the water and the solvent discharged from said stripping unit can be transferred to said cooling unit, and said piping system further comprises a heat exchange part formed so that before the water discharged from said water tank is mixed with said mixture, it can be heat-exchanged with the mixed liquid before being introduced into said cooling unit wherein said condenser is installed at a position where before the mixed liquid discharged from said stripping unit is heat-exchanged, said mixed liquid can be condensed.

2. The solvent separation apparatus according to claim 1, wherein said first pipe line further comprises a steam supply pipe.

3. The solvent separation apparatus according to claim 1, wherein said polymer comprises butadiene rubber, acrylonitrile butadiene rubber, styrene butadiene rubber or solution styrene butadiene rubber.

4. The solvent separation apparatus according to claim 1, wherein said solvent comprises (normal) hexane.

5. A waste heat utilization method comprising:

mixing a mixture comprising a polymer and a solvent with water discharged from a water tank and introducing the mixture into a stripping unit; and introducing a mixed liquid of the water and the solvent discharged from said stripping unit into a cooling unit, wherein before the water discharged from said water tank is mixed with said mixture comprising the polymer and the solvent, the water is heat-exchanged with the mixed liquid before being introduced into said cooling unit in a heat exchanger.

6. The waste heat utilization method according to claim 5, wherein the water discharged from said water tank is mixed with steam and introduced into the stripping unit.

7. The waste heat utilization method according to claim 5, further comprising passing the mixed liquid discharged from said stripping unit through a condenser for condensing said mixed liquid, before being heat-exchanged with the water discharged from said water tank.

8. The waste heat utilization method according to claim 7, wherein a stream discharged from said heat exchanger and a stream discharged from said condenser are controlled to satisfy Equation 1 below:

$$|Tc-Te| \leq 40° C. \quad [\text{Equation 1}]$$

where, Tc represents a temperature of the fluid discharged from said condenser, and Te represents a temperature of the stream discharged from said heat exchanger.

9. The waste heat utilization method according to claim 7, wherein a temperature of the stream discharged from said condenser is 70 to 100° C.

10. The waste heat utilization method according to claim 7, wherein a temperature of the stream discharged from said heat exchanger is 50 to 80° C.

11. The waste heat utilization method according to claim 7, further comprising cooling the mixed liquid passing through said condenser and said heat exchanger to separate water.

* * * * *